US012649520B2

(12) United States Patent
Wang

(10) Patent No.: US 12,649,520 B2
(45) Date of Patent: Jun. 9, 2026

(54) LANE DEPARTURE SUPPRESSION DEVICE, LANE DEPARTURE SUPPRESSION METHOD, AND STORAGE MEDIUM

(71) Applicant: TOYOTA JIDOSHA KABUSHIKI KAISHA, Aichi-ken (JP)

(72) Inventor: Chenyu Wang, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 27 days.

(21) Appl. No.: 18/931,045

(22) Filed: Oct. 30, 2024

(65) Prior Publication Data

US 2025/0229834 A1     Jul. 17, 2025

(30) Foreign Application Priority Data

Jan. 15, 2024    (JP) ................................. 2024-004088

(51) Int. Cl.
B62D 15/02          (2006.01)

(52) U.S. Cl.
CPC ................................. B62D 15/025 (2013.01)

(58) Field of Classification Search
CPC .................................................... B62D 15/025
See application file for complete search history.

(56) References Cited

U.S. PATENT DOCUMENTS

| | | | | |
|---|---|---|---|---|
| 10,780,882 B2 * | 9/2020 | Hajika | .................. | B60W 30/12 |
| 10,839,692 B2 * | 11/2020 | Kawaguchi | ......... | B60W 30/095 |

| | | | | |
|---|---|---|---|---|
| 11,046,361 B2 * | 6/2021 | Suzuki | ................. | B62D 15/025 |
| 12,258,012 B2 * | 3/2025 | Miyawaki | ............. | B60W 30/12 |
| 12,263,838 B2 * | 4/2025 | Itazuri | .................. | B60W 50/14 |
| 12,337,896 B2 * | 6/2025 | Fujita | ................... | B62D 15/025 |
| 2004/0262063 A1 * | 12/2004 | Kaufmann | ........... | B62D 15/025 |
| | | | | 180/169 |
| 2018/0201318 A1 * | 7/2018 | Kataoka | ............... | G06V 20/588 |
| 2019/0152476 A1 | 5/2019 | Hajika et al. | | |
| 2020/0148205 A1 * | 5/2020 | Yoshida | ................ | B60W 60/00 |

FOREIGN PATENT DOCUMENTS

JP          2019-089522 A       6/2019

* cited by examiner

*Primary Examiner* — Carl C Staubach
(74) *Attorney, Agent, or Firm* — HAUPTMAN HAM, LLP

(57)          ABSTRACT

A lane departure suppression device includes a control device configured to perform steering control in which a steering angle of a vehicle is changed such that the vehicle does not depart from a lane, on which the vehicle travels, in a case where the vehicle is about to depart from the lane. The control device ends the steering control when the vehicle reaches a predetermined first horizontal position in the lane after the steering control is started and the control device sets a threshold for determination on whether to stop the steering control to be lower than before the vehicle reaches the second horizontal position when the vehicle reaches a predetermined second horizontal position closer to a boundary line of the lane than the first horizontal position is when the vehicle reaches the second horizontal position before the vehicle reaches the first horizontal position.

10 Claims, 5 Drawing Sheets

FIG. 2A

```
                                          ┌─10
┌─────────────────────────────────────────┐
│                   ECU                    │
│  ┌─────────────────────────────────┐     │
│  │  LANE RECOGNITION UNIT          │─100 │
│  └─────────────────────────────────┘     │
│                                          │
│  ┌─────────────────────────────────┐     │
│  │  LDA CONTROLLER                 │─110 │
│  └─────────────────────────────────┘     │
│                                          │
│  ┌─────────────────────────────────┐     │
│  │  OVERRIDE CONTROLLER            │─120 │
│  └─────────────────────────────────┘     │
└─────────────────────────────────────────┘
```

FIG. 2B

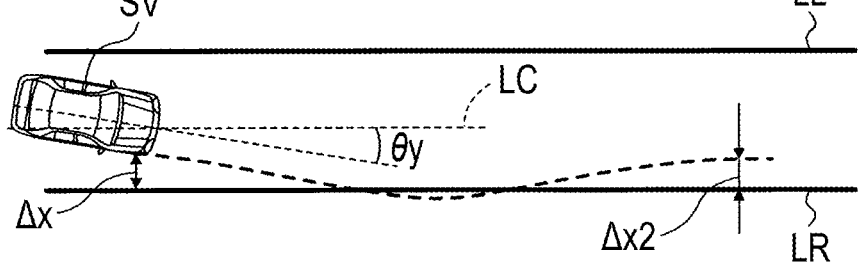

LANE DEPARTURE SUPPRESSION DEVICE, LANE DEPARTURE SUPPRESSION METHOD, AND STORAGE MEDIUM

CROSS-REFERENCE TO RELATED APPLICATION

This application claims priority to Japanese Patent Application No. 2024-004088 filed on Jan. 15, 2024. The disclosure of the above-identified application, including the specification, drawings, and claims, is incorporated by reference herein in its entirety.

BACKGROUND

1. Technical Field

The present disclosure relates to a lane departure suppression device, a lane departure suppression method, and a storage medium.

2. Description of Related Art

For example, disclosed in Japanese Unexamined Patent Application Publication No. 2019-89522 (JP 2019-89522 A) is a technique in which lane departure suppression control is started when a predetermined condition that a vehicle is about to depart from a lane is satisfied and in which determination about the timing of switching into a target turning amount in the lane departure suppression control is performed in consideration of vehicle response delay or lane information detection delay so that the posture of the vehicle at the time of the end of the control is made proper.

SUMMARY

In the technique described in JP 2019-89522 A, determination about the end of the lane departure suppression control is indiscriminately performed based on a specific horizontal position and a continuation time. Therefore, in a case where the horizontal position used for the determination about the end of the control is considerably separated from a departure side boundary line, an override operation performed by a driver may be hindered and thus there is a problem that the driver is hindered from driving the vehicle naturally. Meanwhile, in a case where the horizontal position used for the determination about the end of the control is too close to the departure side boundary line, the lane departure suppression control may end before the driver restarts a steering operation. In other words, the lane departure suppression control ends in a state where sufficient clearance is not secured between the vehicle and the departure side boundary line, which results in a problem that departure from the lane occurs again or the driver is made uneasy. That is, with a method of changing the horizontal position used for the determination about the end of the control, it is difficult to solve both problems.

The present disclosure provides a technique that enables effective suppression of lane departure and effective suppression of a disruption to an override operation performed by a driver.

A first aspect of the disclosure relates to a lane departure suppression device including a control device. The control device is configured to perform steering control in which a steering angle of a vehicle is changed such that the vehicle does not depart from a lane, on which the vehicle travels, in a case where the vehicle is about to depart from the lane. The control device ends the steering control when the vehicle reaches a predetermined first horizontal position in the lane after the steering control is started and the control device sets a threshold for determination on whether or not to stop the steering control by means of a steering operation performed by a driver of the vehicle to be lower than before the vehicle reaches a predetermined second horizontal position closer to a boundary line of the lane than the first horizontal position is when the vehicle reaches the second horizontal position before the vehicle reaches the first horizontal position.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a schematic diagram showing a software configuration of a control device according to the present embodiment;

FIG. 2B is a schematic diagram for description about lane departure suppression control;

DETAILED DESCRIPTION OF EMBODIMENTS

Hereinafter, a lane departure suppression device, a lane departure suppression method, and a storage media according to the present embodiment will be described with reference to the drawings.

Hardware Configuration

Figure 1:
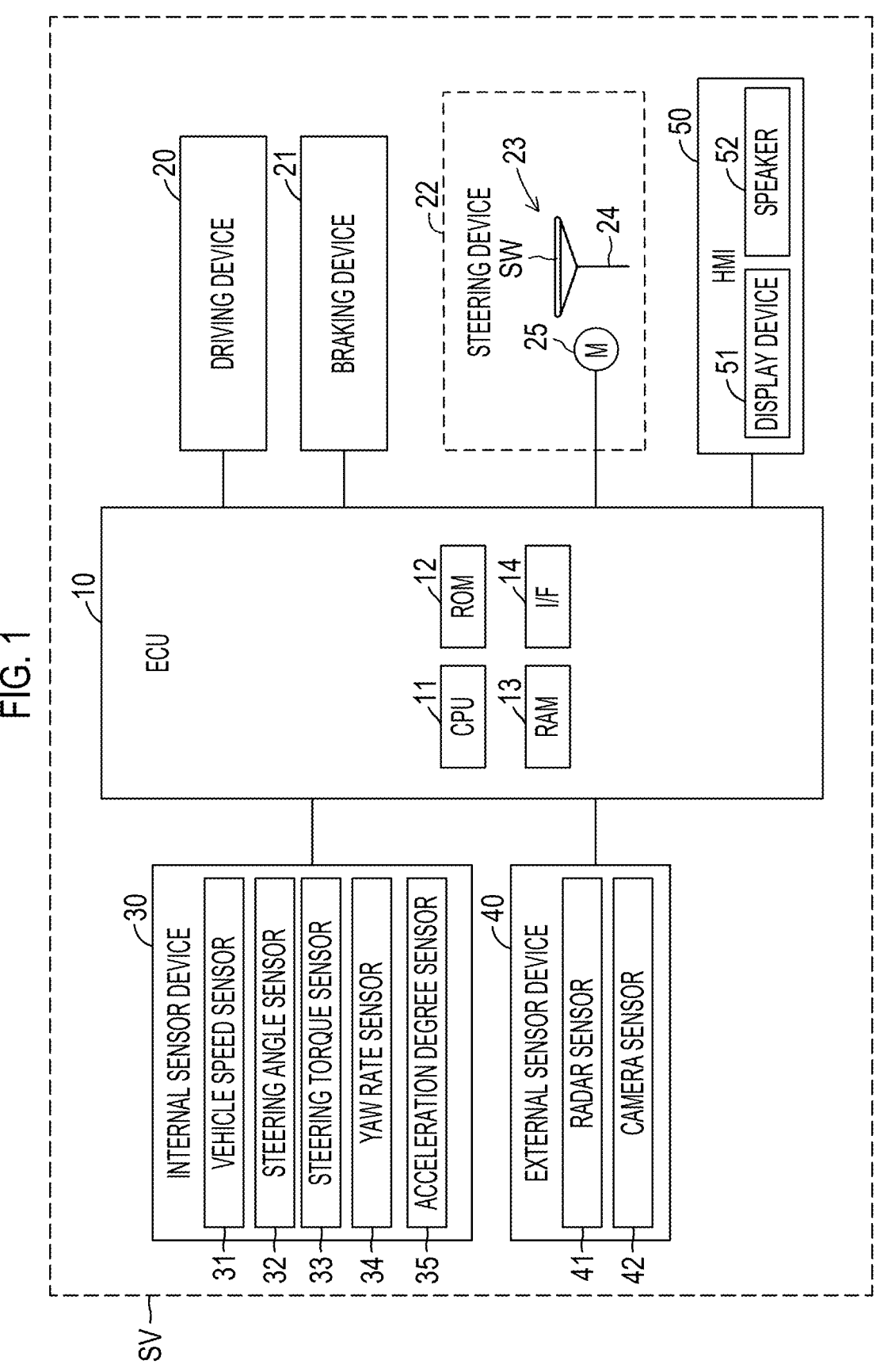
FIG. 1 is a schematic diagram showing a hardware configuration of a vehicle according to the present embodiment.

FIG. 1 is a schematic diagram showing a hardware configuration of a vehicle SV according to the present embodiment.

The vehicle SV includes an electronic control unit (ECU) 10. The ECU 10 includes a central processing unit (CPU) 11, a read only memory (ROM) 12, a random access memory (RAM) 13, an interface device 14, and the like. The CPU 11 is a processor that executes various programs stored in the ROM 12. The ROM 12 is a non-volatile memory and stores data or the like needed for the CPU 11 to execute the various programs. The RAM 13 is a volatile memory that provides a work area that is expanded when the various programs are executed by the CPU 11. The ROM 12 and the RAM 13 are examples of storage media. The program according to the present embodiment is stored in at least one of the storage media. The interface device 14 is a communication device for communication with an external device.

The ECU 10 is a central device for driving assistance, such as lane departure suppression control (lane departure alert control (hereinafter, referred to as LDA control)). The driving assistance is a concept that includes autonomous driving. A driving device 20, a braking device 21, a steering device 22, an internal sensor device 30, an external sensor device 40, a human machine interface (HMI) 50, and the like are communicably connected to the ECU 10.

The driving device 20 generates a drive force to be transmitted to drive wheels of the vehicle SV. Examples of the driving device 20 include an electric motor and an engine. In the present embodiment, the vehicle SV may be any one of a hybrid electric vehicle (HEV), a plug-in hybrid electric vehicle (PHEV), a fuel cell electric vehicle (FCEV), a battery electric vehicle (BEV), and an engine vehicle. The braking device 21 applies a braking force to wheels of the vehicle SV.

The steering device 22 applies a turning force to the wheels of the vehicle SV. The steering device 22 may be any of a rack and pinion type steering device or a steer-by-wire type steering device. The steering device 22 includes a steering operation unit 23 including a steering wheel SW or the like. In addition, the steering device 22 includes a turning motor 25 that applies steering torque to a steering shaft 24. The turning motor 25 generates the steering torque in response to a command from the ECU 10. With the steering torque, right and left steered wheels of the vehicle SV can be turned. Note that the steering operation unit 23 is not limited to the steering wheel SW and may be a steering rod which has a shape other than a wheel-like shape.

The internal sensor device 30 is a kind of sensor that detects the state of the vehicle SV. Specifically, the internal sensor device 30 includes a vehicle speed sensor 31, a steering angle sensor 32, a steering torque sensor 33, a yaw rate sensor 34, an acceleration degree sensor 35, and the like.

The vehicle speed sensor 31 detects the traveling speed (a vehicle speed V) of the vehicle SV. The steering angle sensor 32 detects the rotation angle of the steering wheel SW or the steering shaft 24 of the vehicle SV, that is, a steering angle σD. The steering torque sensor 33 detects the rotational torque of the steering wheel SW or the steering shaft 24, that is, steering torque Tq. The yaw rate sensor 34 detects the yaw rate of the vehicle SV. The acceleration degree sensor 35 detects the acceleration degree of the vehicle SV. The internal sensor device 30 transmits, at predetermined intervals, the state of the vehicle SV detected by each of the sensors 31 to 35 to the ECU 10.

The external sensor device 40 is a sensor that recognizes target information regarding a target in the vicinity of the vehicle SV. Specifically, the external sensor device 40 includes a radar sensor 41, a camera sensor 42, and the like. Here, examples of the target information include a nearby vehicle, a compartment line, such as a white line drawn on a road surface, a curb, a guardrail, and a wall.

The radar sensor 41 detects a target present in the vicinity of the vehicle SV. Examples of the radar sensor 41 include a millimeter wave radar and/or a LiDAR. The millimeter wave radar emits radio waves (millimeter waves) in a millimeter wave band and receives millimeter waves (reflected waves) reflected by a target present in an emission range. The millimeter wave radar acquires a relative distance between the vehicle SV and the target, a relative speed between the vehicle SV and the target, and the like based on a phase difference between the transmitted millimeter waves and the received reflected waves, an attenuation level of the reflected waves, a time between transmission of the millimeter waves and reception of the reflected waves, and the like. The LiDAR sequentially performs scanning with pulse-shaped laser beams having a shorter wavelength than the millimeter waves in a plurality of directions, and receives reflected light reflected by the target to acquire the shape of the target detected in front of the vehicle SV, the relative distance between the vehicle SV and the target, the relative speed between the vehicle SV and the target, and the like.

The camera sensor 42 images the vicinity of the vehicle SV and acquires target information about the vicinity of the vehicle SV by processing image data obtained by imaging the vicinity of the vehicle SV. As the camera sensor 42, for example, a digital camera including an imaging device, such as a CMOS or a CCD, can be used. The target information is information indicating the type of a target detected in the vicinity of the vehicle SV, a relative distance between the vehicle SV and the target, a relative speed between the vehicle SV and the target, and the like. The type of the target may be recognized by machine learning, such as pattern matching.

The external sensor device 40 repeatedly transmits the acquired target information to the ECU 10 each time a predetermined time elapses. The ECU 10 determines a relative relationship between the vehicle SV and the target by synthesizing a relative relationship between the vehicle SV and the target that is obtained by the radar sensor 41 and a relative relationship between the vehicle SV and the target that is obtained by the camera sensor 42. The external sensor device 40 does not need to include both the radar sensor 41 and the camera sensor 42, and may include, for example, the camera sensor 42 alone.

The HMI 50 is an interface for input and output of information between the ECU 10 and a driver, and the HMI 50 includes an input device and an output device. Examples of the input device include a touch panel, a switch, and a voice pickup microphone. Examples of the output device include a display device 51 and a speaker 52. The display device 51 is, for example, a center display, a multi-information display, a head-up display, or a display of a navigation system installed in an instrument panel or the like. The speaker 52 is, for example, a speaker of an acoustic system or a navigation system.

Software Configuration

FIG. 2A is a schematic diagram showing a software configuration of the ECU 10 according to the present embodiment. As shown in FIG. 2A, the ECU 10 includes a lane recognition unit 100, an LDA controller 110, an override controller 120, and the like as functional elements. The functional elements 100 to 120 are realized when the CPU 11 of the ECU 10 reads a program stored in the ROM 12 into the RAM 13 and executes the program. Note that although each of the functional elements 100 to 120 will be described as elements included in the ECU 10, which is integral hardware in the present embodiment, any of the functional elements 100 to 120 may be provided in another ECU different from the ECU 10. In addition, all or part of the functional elements 100 to 120 of the ECU 10 may be provided in an information processing device of a facility (for example, a management center) that can communicate with the vehicle SV.

The lane recognition unit 100 recognizes, based on a result of detection performed by the external sensor device 40, a traveling lane on which the vehicle SV is traveling. Here, the traveling lane refers to a traveling area that is not defined solely by a compartment line, such as a white line or a yellow line, drawn on a road surface and that is also defined by a structure, such as a curb, a guardrail, or a wall. Note that in the following description, for the sake of convenience, a boundary of a traveling area defined by a compartment line, a structure, or the like as described above will be referred to as a "boundary line".

As shown in FIG. 2B, the lane recognition unit 100 recognizes a left boundary line LL and a right boundary line LR. In addition, the lane recognition unit 100 calculates a curvature radius R of a center line LC corresponding to a central position between the right and left boundary lines LR, LL and calculates a deviation angle (hereinafter, a yaw angle θy) between a direction in which the center line LC extends and a direction that the vehicle SV faces. Furthermore, the lane recognition unit 100 calculates a distance (hereinafter, a horizontal position Δx) between the vehicle SV (for example, a left front wheel) and the left boundary line LL in a road width direction, and a distance between the vehicle SV (for example, a right front wheel) and the right boundary line LR in the road width direction. FIG. 2B solely shows the horizontal position Δx between the vehicle SV and the right boundary line LR. In this case, although there are two horizontal positions Δx on right and left sides, in LDA control which will be described later, the horizontal position Δx related to a direction in which the vehicle SV is expected to depart from the traveling lane, that is, a direction indicated by the yaw angle θy, may be used. Hereinafter, the horizontal positions Δx, the yaw angle θy, and the curvature radius R calculated by the lane recognition unit 100 may be collectively referred to as "traveling lane information".

When the vehicle SV is likely to depart from a traveling lane, the LDA controller 110 gives an alarm via the HMI 50 or issues a departure warning by applying vibration to the steering wheel SW and executes LDA control to suppress departure of the vehicle SV from the traveling lane by controlling the operation of the steering device 22 or the braking device 21. The LDA controller 110 calculates a target steering angle of the LDA control (hereinafter, referred to as an LDA target steering angle σB) based on traveling lane information (Δx, θY, R) acquired by the lane recognition unit 100. The LDA target steering angle σB is a steering angle set such that the vehicle SV does not depart beyond the boundary lines LR, LL (the right boundary line LR in an example shown in the drawing).

The LDA controller 110 determines whether an LDA start condition is satisfied. Examples of the LDA start condition include a condition that an estimated reaching time TR, in which the vehicle SV is expected to reach the boundary line LL or the boundary line LR (the right boundary line LR in the example shown in the drawing), is shorter than a predetermined threshold time Tv (TR<Tv). The estimated reaching time TR can be obtained based on a well-known equation or the like on an assumption that the vehicle SV performs uniform-acceleration linear motion until the vehicle SV reaches the boundary line LL or the boundary line LR.

When the LDA start condition is satisfied, the LDA controller 110 calculates an LDA assist torque Ts based on a steering angle difference Aa between the LDA target steering angle σB and an actual steering angle σD acquired by the steering angle sensor 32. In addition, when the LDA controller 110 calculates the LDA assist torque Ts, the LDA controller 110 transmits, to the steering device 22, a command signal including information indicating the LDA assist torque Ts. Accordingly, the LDA assist torque Ts is transmitted from the turning motor 25 to the steering shaft 24, and the steered wheels of the vehicle SV are turned such that the vehicle SV is restrained from departing from a traveling lane. When the horizontal position Δx of the vehicle SV acquired by the lane recognition unit 100 is made equal to or greater than a predetermined end determination horizontal position Δx2 after the LDA controller 110 starts the LDA control, the LDA controller 110 ends the LDA control. The end determination horizontal position Δx2 is an example of a "first horizontal position" in an aspect of the present disclosure.

In a case where the steering torque Tq (the absolute value thereof) detected by the steering torque sensor 33 is made equal to or larger than a predetermined first torque threshold Tq1 during the LDA control executed by the LDA controller 110, the override controller 120 executes an override to forcibly end (that is, stop) the LDA control to give priority to a steering operation performed by the driver over the LDA control.

Meanwhile, when the first torque threshold Tq1, which is an LDA override condition, is kept constant (fixed) over a time period between when the LDA control is started and when the horizontal position Δx of the vehicle SV reaches the end determination horizontal position Δx2, an override operation performed by the driver may be hindered, which hinders the driver from driving the vehicle naturally. On the other hand, when the first torque threshold Tq1 is changed to a small value at an early stage after the start of the LDA control, the LDA control may end easily before the driver restarts a steering operation, which can cause departure again or cause the driver to feel uneasy. In the present embodiment, the override controller 120 changes the first torque threshold Tq1, which is the LDA override condition, at optimal timing so that such problems are solved.

Figure 3:
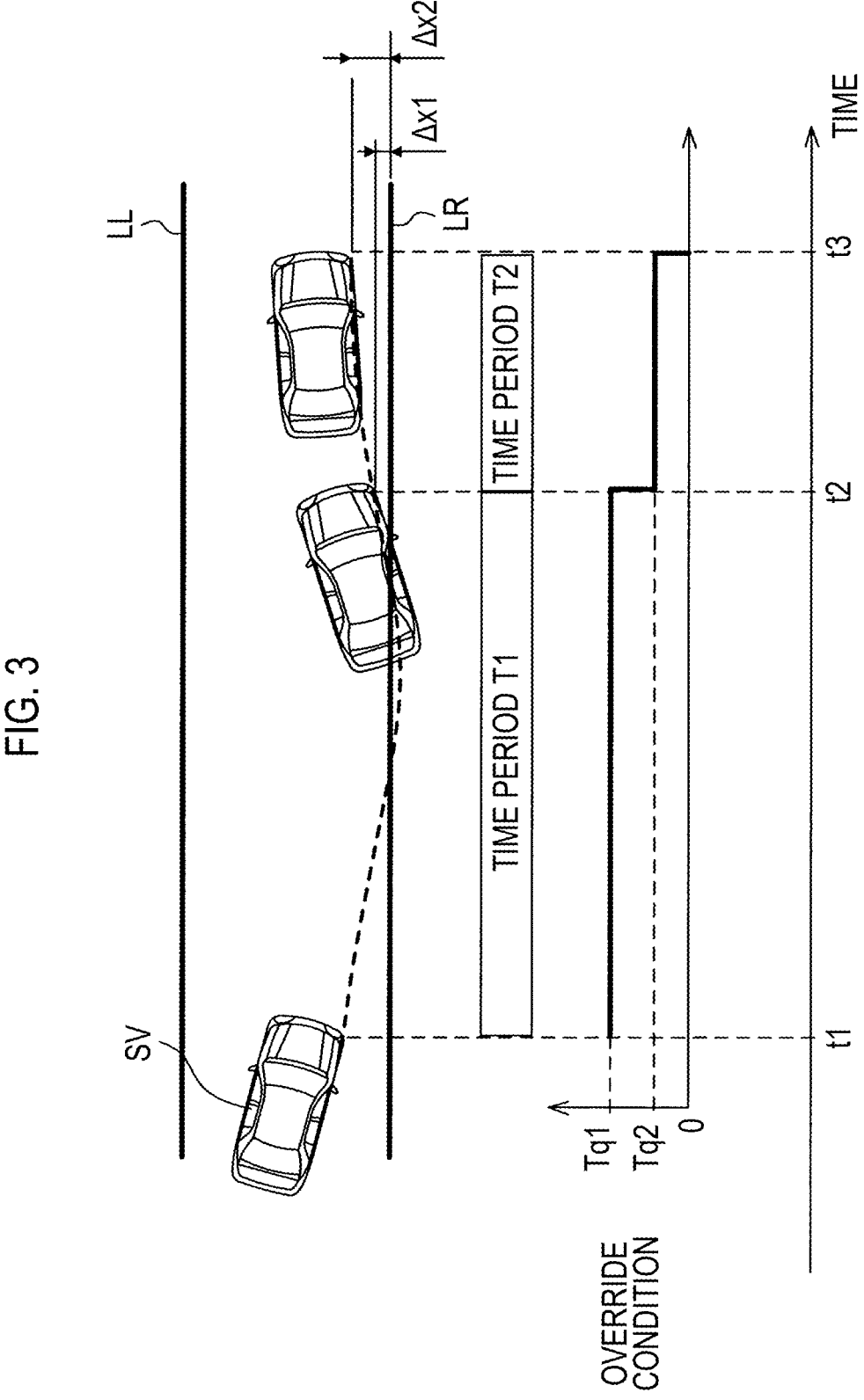
FIG. 3 is a schematic diagram for description about an override condition changing process according to the present embodiment.

FIG. 3 is a schematic diagram for description about an override condition changing process performed by the override controller 120. When the LDA start condition is satisfied at time t1, the LDA controller 110 starts the LDA control. Time t3 is a time at which the LDA controller 110 ends the LDA control since the horizontal position Δx of the vehicle SV reaches the end determination horizontal position Δx2. When the horizontal position Δx of the vehicle SV becomes equal to or larger than a predetermined change determination horizontal position Δx1, which is closer to the right boundary line LR than the end determination horizontal position Δx2 is, the override controller 120 changes the override condition to a second torque threshold Tq2 (<Tq1), which is smaller than the first torque threshold Tq1. The change determination horizontal position Δx1 is an example of a "second horizontal position" in an aspect of the present disclosure.

That is, since the override condition is set to the first torque threshold Tq1 for a time period T1 (a time period taken for the vehicle SV to return to the inside of the traveling lane beyond the right boundary line LR) between time t1 at which the LDA control is started and time t2 at which the horizontal position Δx of the vehicle SV reaches the change determination horizontal position Δx1, departure can be effectively restrained from occurring again. In addition, since the override condition is changed to the second torque threshold Tq2, which is smaller than the first torque threshold Tq1, for a time period T2 between time t2 at which the horizontal position Δx of the vehicle SV reaches the change determination horizontal position Δx1 and time t3 at which the horizontal position Δx reaches the end determination horizontal position Δx2, the LDA control can be easily stopped when the driver performs an override operation. That is, the steering operation performed by the driver is more likely to be prioritized, which enables realization of natural driving of the driver.

Figure 4:
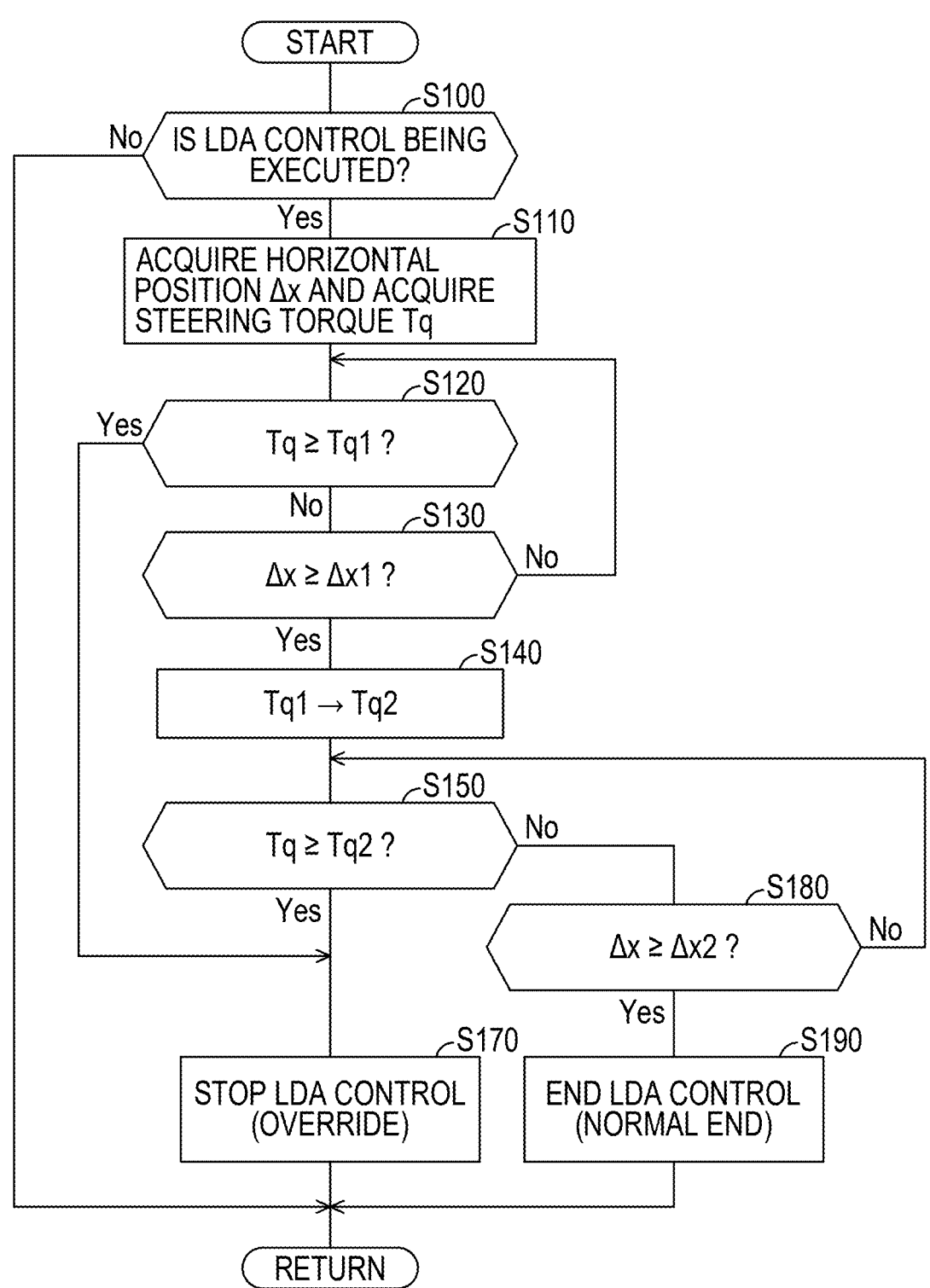
FIG. 4 is a flowchart for description about a routine of the override condition changing process according to the present embodiment.

FIG. 4 is a flowchart for description about the routine of an override condition changing process performed by the CPU 11 of the ECU 10. The present routine is started when the vehicle SV travels, for example.

In step S100, the ECU 10 determines whether the LDA control is being executed. In a case where the LDA control is being executed (Yes), the ECU 10 proceeds to the process of step S110. Meanwhile, when the LDA control is not being executed (No), the ECU 10 returns to the start of the present routine.

In step S110, the ECU 10 acquires the horizontal positions Δx, which are distances between the vehicle SV and the boundary lines LL, LR, and acquires the steering torque Tq detected by the steering torque sensor 33. Next, in step S120, the ECU 10 determines whether the steering torque Tq is equal to or greater than the first torque threshold Tq1. In a case where the steering torque Tq is equal to or greater than the first torque threshold Tq1 (Yes), the ECU 10 proceeds to the process of step S170, executes an override to stop the LDA control, and returns to the start of the present routine. Meanwhile, in a case where the steering torque Tq is not equal to or greater than the first torque threshold Tq1 (No), that is, in a case where the steering torque Tq is smaller than the first torque threshold Tq1, the ECU 10 proceeds to the process of step S130.

In step S130, the ECU 10 determines whether the horizontal position Δx of the vehicle SV has reached the change determination horizontal position Δx1. In a case where the horizontal position Δx of the vehicle SV has not reached the change determination horizontal position Δx1 (No), the ECU 10 returns to the process of step S120. Meanwhile, in a case where the horizontal position Δx of the vehicle SV has reached the change determination horizontal position Δx1 (Yes), the ECU 10 proceeds to the process of step S140.

In step S140, the ECU 10 executes a change process to change the override condition to the second torque threshold Tq2 smaller than the first torque threshold Tq1. Next, in step S150, the ECU 10 determines whether the steering torque Tq is equal to or greater than the second torque threshold Tq2. In a case where the steering torque Tq is equal to or greater than the second torque threshold Tq2 (Yes), the ECU 10 proceeds to the process of step S170, executes the override to stop the LDA control, and returns to the start of the present routine. Meanwhile, in a case where the steering torque Tq is not equal to or greater than the second torque threshold Tq2 (No), that is, in a case where the steering torque Tq is smaller than the second torque threshold Tq2, the ECU 10 proceeds to the process of step S180.

In step S180, the ECU 10 determines whether the horizontal position Δx of the vehicle SV has reached the end determination horizontal position Δx2. In a case where the horizontal position Δx of the vehicle SV has not reached the end determination horizontal position Δx2 (No), the ECU 10 returns to the process of step S150. Meanwhile, in a case where the horizontal position Δx of the vehicle SV has reached the end determination horizontal position Δx2 (Yes), the ECU 10 proceeds to the process of step S190, ends the LDA control, and returns to the start of the present routine.

The lane departure suppression device, the lane departure suppression method, and the storage medium according to the present embodiment have been described above. However, the present disclosure is not limited to the above-described embodiment, and various modifications can be made without departing from the scope of the present disclosure.

Figure 5:
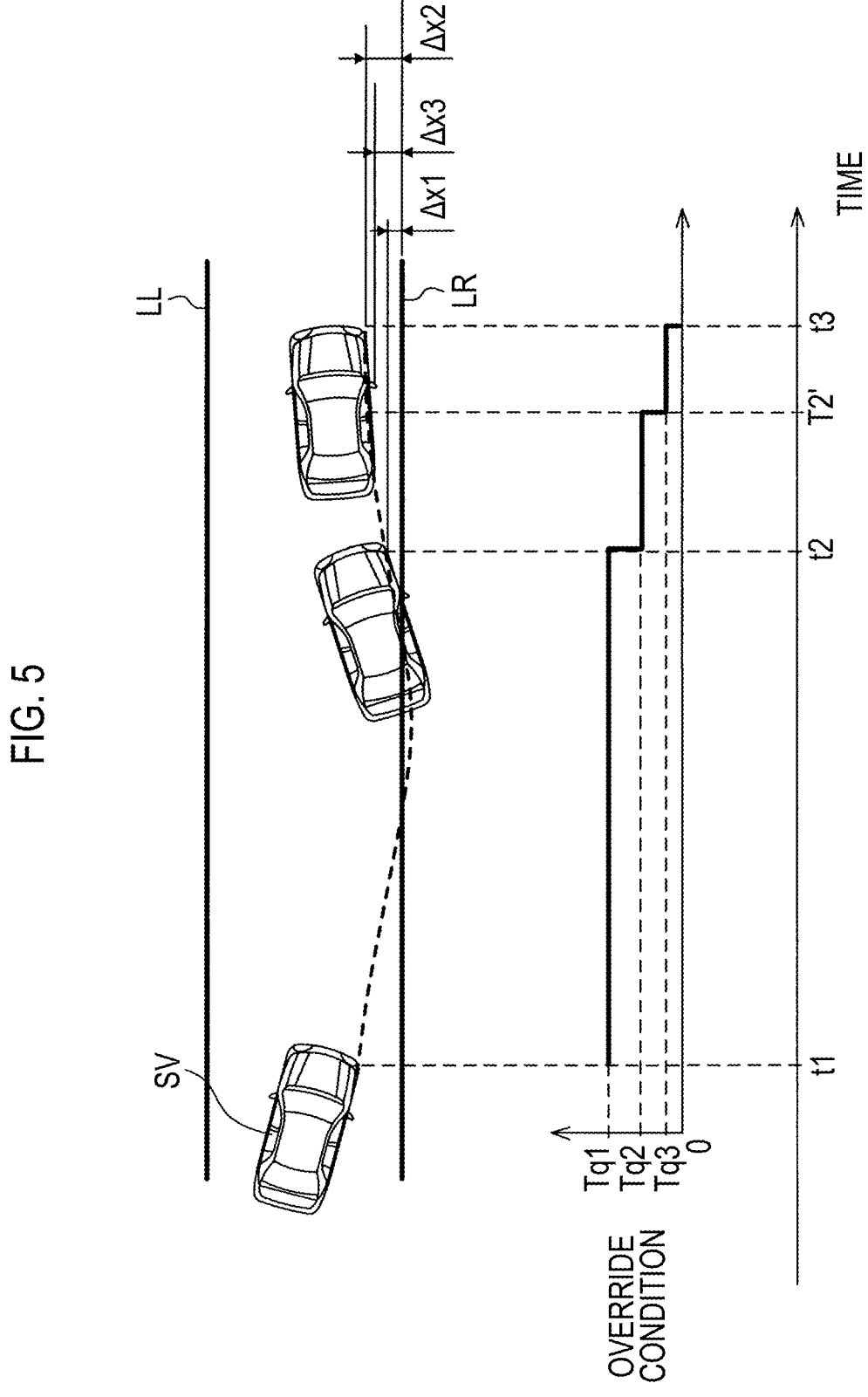
FIG. 5 is a schematic diagram for description about an override condition changing process according to another embodiment.

For example, a configuration as shown in FIG. 5 in which a second change determination horizontal position Δx3 (a third horizontal position in an aspect of the present disclosure) is set between the change determination horizontal position Δx1 and the end determination horizontal position Δx2 and the override condition is lowered in a stepwise manner at a time (time t2) at which the horizontal position Δx of the vehicle SV reaches the change determination horizontal position Δx1 and a time (time t2') at which the horizontal position Δx of the vehicle SV reaches the second change determination horizontal position Δx3 may also be adopted.

Specifically, the override condition is changed to the second torque threshold Tq2 smaller than the first torque threshold Tq1 at the time (time t2) at which the horizontal position Δx of the vehicle SV reaches the change determination horizontal position Δx1 and the override condition is changed to a third torque threshold Tq3 smaller than the second torque threshold Tq2 at the time (time t2') at which the horizontal position Δx of the vehicle SV reaches the second change determination horizontal position Δx3. In this case, it is possible to more effectively realize suppression of re-departure and suppression of a disruption to an override operation performed by a driver.

In addition, a torque threshold, which is an override condition, may be lowered linearly or curvilinearly after the time (time t2), at which the horizontal position Δx of the vehicle SV reaches the change determination horizontal position Δx1, instead of being changed in a stepwise manner as shown in FIG. 5.

In addition, the technique of the present disclosure can also be applied to an autonomous driving vehicle that autonomously performs part or all of driving operations. In this case, the vehicle may transition to full autonomous driving after the LDA control (including the override) of the present disclosure ends.

What is claimed is:

1. A lane departure suppression device comprising a processor configured to perform steering control in which a steering angle of a vehicle is changed such that the vehicle does not depart from a lane, on which the vehicle travels, in a case where the vehicle is about to depart from the lane, wherein the processor is configured to end the steering control when a vehicle horizontal position of the vehicle reaches a first horizontal position in the lane after the steering control is started, and wherein, while the steering control is being executed, the processor is configured to execute an override condition changing process including:

acquiring (i) the vehicle horizontal position that is a distance between the vehicle and a boundary line and (ii) a steering torque applied to a steering member by a driver, the boundary line being a side of the lane that the vehicle is closest to;

determining whether the steering torque is equal to or greater than a first torque threshold;

in a case where the steering torque is determined to be equal to or greater than the first torque threshold, executing an override to stop the steering control;

in a case where the steering torque is determined to be less than the first torque threshold, determining whether the vehicle horizontal position has reached the first horizontal position, the first horizontal position being closer to the boundary line than a second horizontal position;

in a case where the vehicle horizontal position is determined to have reached the first horizontal position, changing an override condition by replacing the first torque threshold with a second torque threshold that is less than the first torque threshold;

after the changing, determining whether the steering torque is equal to or greater than the second torque threshold; and in a case where the steering torque is determined to be equal to or greater than the second torque threshold, executing the override to stop the steering control.

2. The lane departure suppression device according to claim 1, wherein:

a third horizontal position is set between the first horizontal position and the second horizontal position; and the processor is configured to lower the override condition in a stepwise manner by:

replacing the first torque threshold with the second torque threshold when the vehicle horizontal position reaches the second horizontal position; and replacing the second torque threshold with a third torque threshold that is less than the second torque threshold when the vehicle horizontal position reaches the third horizontal position.

3. A lane departure suppression method comprising performing steering control in which a steering angle of a vehicle is changed such that the vehicle does not depart from a lane, on which the vehicle travels, in a case where the vehicle is about to depart from the lane, wherein the steering control is ended when a vehicle horizontal position of the vehicle reaches a first horizontal position in the lane after the steering control is started, and wherein, while the steering control is being executed, an override condition changing process is executed including:

acquiring (i) the vehicle horizontal position that is a distance between the vehicle and a boundary line and (ii) a steering torque applied to a steering member by a driver, the boundary line being a side of the lane that the vehicle is closest to;

determining whether the steering torque is equal to or greater than a first torque threshold;

in a case where the steering torque is determined to be equal to or greater than the first torque threshold, executing an override to stop the steering control;

in a case where the steering torque is determined to be less than the first torque threshold, determining whether the vehicle horizontal position has reached the first horizontal position, the first horizontal position being closer to the boundary line than a second horizontal position;

in a case where the vehicle horizontal position is determined to have reached the first horizontal position, changing an override condition by replacing the first torque threshold with a second torque threshold that is less than the first torque threshold;

after the changing, determining whether the steering torque is equal to or greater than the second torque threshold; and in a case where the steering torque is determined to be equal to or greater than the second torque threshold, executing the override to stop the steering control.

4. A non-transitory storage medium storing a program causing a computer of a lane departure suppression device configured to perform steering control in which a steering angle of a vehicle is changed such that the vehicle does not depart from a lane, on which the vehicle travels, in a case where the vehicle is about to depart from the lane to execute a process, the process comprising:

ending the steering control when a vehicle horizontal position of the vehicle reaches a first horizontal position in the lane after the steering control is started; and while the steering control is being executed, executing an override condition changing process including:

acquiring (i) the vehicle horizontal position that is a distance between the vehicle and a boundary line and (ii) a steering torque applied to a steering member by a driver, the boundary line being a side of the lane that the vehicle is closest to;

determining whether the steering torque is equal to or greater than a first torque threshold;

in a case where the steering torque is determined to be equal to or greater than the first torque threshold, executing an override to stop the steering control;

in a case where the steering torque is determined to be less than the first torque threshold, determining whether the vehicle horizontal position has reached the first horizontal position, the first horizontal position being closer to the boundary line than a second horizontal position;

in a case where the vehicle horizontal position is determined to have reached the first horizontal position, changing an override condition by replacing the first torque threshold with a second torque threshold that is less than the first torque threshold;

after the changing, determining whether the steering torque is equal to or greater than the second torque threshold; and in a case where the steering torque is determined to be equal to or greater than the second torque threshold, executing the override to stop the steering control.

5. The lane departure suppression device according to claim 1, wherein the processor is configured to determine that the vehicle is about to depart from the lane when an estimated reaching time in which the vehicle is expected to reach the boundary line is shorter than a predetermined threshold time.

6. The lane departure suppression device according to claim 1, wherein the processor is configured to change the override condition by lowering the first torque threshold linearly or curvilinearly after the vehicle horizontal position reaches the second horizontal position.

7. The lane departure suppression method according to claim 3, wherein determining that the vehicle is about to depart from the lane comprises determining that an estimated reaching time in which the vehicle is expected to reach the boundary line is shorter than a predetermined threshold time.

8. The lane departure suppression method according to claim 3, wherein changing the override condition comprises lowering the first torque threshold linearly or curvilinearly after the vehicle horizontal position reaches the second horizontal position.

9. The non-transitory storage medium according to claim 4, wherein the process further comprises determining that the vehicle is about to depart from the lane when an estimated reaching time in which the vehicle is expected to reach the boundary line is shorter than a predetermined threshold time.

10. The non-transitory storage medium according to claim 4, wherein changing the override condition comprises lowering the first torque threshold linearly or curvilinearly after the vehicle horizontal position reaches the second horizontal position.

* * * * *